United States Patent
Ishikawa

(10) Patent No.: US 6,850,365 B2
(45) Date of Patent: Feb. 1, 2005

(54) OPTICAL MULTILAYER STRUCTURE AND ITS PRODUCTION METHOD, OPTICAL SWITCHING DEVICE, AND IMAGE DISPLAY

(75) Inventor: Hiroichi Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/380,224
(22) PCT Filed: Jul. 12, 2002
(86) PCT No.: PCT/JP02/07124
§ 371 (c)(1),
(2), (4) Date: Mar. 11, 2003
(87) PCT Pub. No.: WO03/007050
PCT Pub. Date: Jan. 23, 2003

(65) Prior Publication Data
US 2004/0027701 A1 Feb. 12, 2004

(30) Foreign Application Priority Data
Dec. 7, 2001 (JP) .............. 2001-212251

(51) Int. Cl.[7] .............. G02B 1/10
(52) U.S. Cl. .............. 359/586; 359/577; 359/578; 359/584; 359/589; 359/247; 359/290; 385/16
(58) Field of Search .............. 359/577–579, 359/584, 586, 589, 247, 248, 290, 291; 385/16, 18

(56) References Cited

U.S. PATENT DOCUMENTS

| 5,500,761 A | 3/1996 | Goossen et al. |
| 5,636,052 A | 6/1997 | Goossen et al. |
| 5,654,819 A | * 8/1997 | Goossen et al. .............. 359/291 |
| 6,643,052 B1 | * 11/2003 | Goossen .............. 359/290 |
| 2003/0152314 A1 | * 8/2003 | Aoki et al. .............. 385/16 |

FOREIGN PATENT DOCUMENTS

| JP | 08-211847 | 8/1996 |
| JP | 11-211999 | 8/1999 |

* cited by examiner

Primary Examiner—Leo Boutsikaris
(74) Attorney, Agent, or Firm—Sonnenschein, Nath & Rosenthal LLP

(57) ABSTRACT

Provided is an optical multilayer structure having a simpler configuration, flexibility in selection of materials and improved reliability in wiring and capable of high-speed response even in a visible light range. A optical multilayer structure (1) has a first layer (11) being light-absorptive and making contact with a substrate (10), a gap portion (12) having as large a size as light interference phenomenon can occur and being capable of varying the size, and a second layer (13) being transparent in this order on the substrate (10). Where a complex refractive index of the first layer (11) is $N_1$ ($=n_1-i\cdot k_1$, $n_1$ is a refractive index, $k_1$ is an extinction coefficient, and $i$ is an imaginary unit), a refractive index of the second layer (13) is $n_2$, and a refractive index of an incident medium is 1.0, the optical multilayer structure (1) is configured so as to satisfy the following formula.

$$\left(n_1 - \frac{n_2^2+1}{2}\right)^2 + k_1^2 - \left(\frac{n_2^2-1}{2}\right)^2 = 0.$$

23 Claims, 11 Drawing Sheets

OPTICAL MULTILAYER STRUCTURE AND ITS PRODUCTION METHOD, OPTICAL SWITCHING DEVICE, AND IMAGE DISPLAY

BACKGROUND OF THE INVENTION

The present invention relates to an optical multilayer structure having a function of reflecting, transmitting or absorbing incident light, a method of manufacturing the same, an optical switching device and an image display apparatus.

In recent years, displays as image information display devices have been taken on greater importance, and the development of optical switching devices (light valves) operating at high speed as devices for the displays and devices for optical communications, optical storage, optical printers or the like has been in demand. Conventionally, as devices of this kind, a device using a liquid crystal, a device using a micromirror (DMD: digital micromirror device, a trademark of Texas Instruments Inc.), a device using a diffraction grating (GLV: grating light valve manufactured by SLM (Silicon Light Machines)) and so on are cited.

The GLV forms a diffraction grating with MEMS (micro-electromechanical systems) to implement an optical switching device with a high speed of 10 ns by an electrostatic force. The DMD has the same MEMS to perform switching through moving a mirror. A display such as a projector can be implemented by the use of these devices, however, in order to implement the display as a light valve, a two-dimensional array must be used because a liquid crystal and the DMD have low operating speed, thereby the configuration of the display becomes complicated. On the other hand, the GLV is a high-speed operation type, so a projection display can be implemented through scanning a one-dimensional array.

However, the GLV has a diffraction grating, so there is complexity such that a pixel is required to include six devices, or diffracted lights directed toward two directions are required to be focused on one direction by an optical system of some kind.

A light valve which can be implemented with a simple configuration has been disclosed in U.S. Pat. No. 5,589,974 or U.S. Pat. No. 5,500,761. The light valve has such a configuration that a translucent thin film with a refractive index of $\sqrt{n_s}$ is disposed on a substrate (with a refractive index $n_s$) with a gap portion (gap layer) in between. In the device, the thin film is driven by the use of an electrostatic force to vary a distance between the substrate and the thin film, that is, a size of the gap portion, and thereby an optical signal is transmitted or reflected. Herein, the refractive index of the thin film is $\sqrt{n_s}$ with respect to the refractive index $n_s$ of the substrate, and it is considered that high-contrast optical modulation can be achieved through satisfying such a relationship.

However, in the device with the above-described configuration, there is such a problem that unless the refractive index $n_s$ of the substrate is as large a value as "4", high-contrast optical modulation cannot be achieved in a visible light range. In other words, the translucent thin film requires strength as a three-dimensional configuration, so a material such as silicon nitride ($Si_3N_4$) (refractive index n=2.0) is preferable as the translucent thin film, however, in this case, the refractive index $n_s$ of the substrate is 4. In the visible light range, there are not many choices of materials of this kind. In a wavelength for communications such as infrared radiation, the device can be implemented by the use of germanium (Ge) (n=4), silicon (Si) ($n \leq 4$) or the like.

Moreover, in the light valve disclosed in U.S. Pat. No. 5,500,761 or the like, a structural material such as silicon nitride ($Si_3N_4$) is disposed on a silicon substrate with a gap portion in between. However, in such a configuration, a widely recognized method as dry etching of a sacrificial layer, that is, a method of forming a sacrificial layer of silicon (Si), and then etching the sacrificial layer by the use of xenon difluoride ($XeF_2$) cannot be used. It is because, as the substrate is also formed of Si, selectivity to the sacrificial layer cannot be obtained. Therefore, in the above-described configuration, it appears that other method such as wet etching is used. In wet etching, it is difficult for an etching solution to enter into and smoothly circulate in a gap of approximately $\lambda/4$, so etching may not be able to be performed, or a structural material on the sacrificial layer may be damaged during drying due to a surface tension of the solution or the like, thereby it is difficult to form a desired structure. When a relative area of a part which becomes an optical switch is reduced so as to decrease an aperture, the structure can be implemented through a process such as wet etching, although, in a structure for image display, there is a tendency to increase the aperture, so it is desired to reduce a portion where the etching solution enters. Therefore, dry etching is more suitable than wet etching. However, as described above, when the substrate is formed of Si, there is such a problem that a method of forming the sacrificial layer of Si, and then etching the sacrificial layer by $XeF_2$ is not applicable.

In view of the foregoing, it is a first object of the invention to provide an optical multilayer structure which has a simple, compact and lightweight configuration and flexibility in selection of a structural material, is capable of high-speed response in a visible light range, and is preferably used for an image display apparatus or the like.

It is a second object of the invention to provide a method of manufacturing an optical multilayer structure in which in a step of forming a gap portion, even though a sacrificial layer is formed of Si, dry etching using $XeF_2$ is applicable, and which is capable of easily manufacturing an optical multilayer structure with high aperture.

Moreover, it is a third object of the invention to provide an optical switching device and an image display apparatus which are capable of high-speed response by the use of the above optical multilayer structure.

SUMMARY OF THE INVENTION

A first optical multilayer structure according to the invention comprises a configuration including a first layer being light-absorptive, a gap portion with as large a size as a light interference phenomenon can occur, the size being variable, and a second layer being transparent disposed in this order on a substrate, wherein the first layer has as large a thickness as optical information of the substrate becomes invisible, and where a complex refractive index of the first layer is $N_1$ ($=n_1-i \cdot k_1$, $n_1$ is a refractive index, $k_1$ is an extinction coefficient, and i is an imaginary unit), a refractive index of the second layer is $n_2$, and a refractive index of an incident medium is 1.0, a relationship of Mathematical Formula 1 is satisfied.

$$\left(n_1 - \frac{n_2^2+1}{2}\right)^2 + k_1^2 - \left(\frac{n_2^2-1}{2}\right)^2 = 0 \qquad \text{(Mathematical Formula 1)}$$

A second optical multilayer structure according to the invention comprises a configuration including a gap portion with as large a size as a light interference phenomenon can occur, the size being variable, and a transparent layer disposed in this order on a substrate being light-absorptive, wherein where a complex refractive index of the substrate is $N_1$ (=$n_1$–i·$k_1$, $n_1$ is a refractive index, $k_1$ is an extinction coefficient, and i is an imaginary unit), a refractive index of the transparent layer is $n_2$, and a refractive index of an incident medium is 1.0, a relationship of Mathematical Formula 1 is satisfied.

A first optical switching device according to the invention comprises the first optical multilayer structure of the invention and a driving means for varying an optical size of the gap portion in the optical multilayer structure.

A second optical switching device according to the invention comprises the second optical multilayer structure of the invention and a driving means for varying an optical size of the gap portion in the optical multilayer structure.

A first image display apparatus according to the invention comprises a plurality of the first optical switching devices of the invention one-dimensionally or two-dimensionally arranged, wherein the plurality of the first optical switching devices are irradiated with lights of primary colors and the lights are scanned by a scanner so as to display a two-dimensional image.

A second image display apparatus according to the invention comprises a plurality of the second optical switching devices of the invention one-dimensionally or two-dimensionally arranged, wherein the plurality of the second optical switching devices are irradiated with lights of primary colors, and the lights are scanned by a scanner so as to display a two-dimensionally image.

In the first or the second optical multilayer structure of the invention, when the size of the gap portion is varied between an odd multiple of "λ/4" (λ is a designed wavelength of incident light) and an even multiple (including 0) of "λ/4" in a binary or continuous manner, an amount of reflection, transmission or absorption of the incident light is varied in a binary or continuous manner.

In the first or the second optical switching device of the invention, the driving means varies the optical size of the gap portion in the optical multilayer structure so as to perform a switching operation on the incident light.

In the first or the second image display apparatus of the invention, the plurality of the optical switching devices of the invention one-dimensionally or two-dimensionally arranged are irradiated with light so as to display a two-dimensional image.

DETAILED DESCRIPTION OF THE PRESENTLY PREFERRED EMBODIMENTS

Preferred embodiments of the present invention will be described in more detail below referring to the accompanying drawings.

Figure 1:
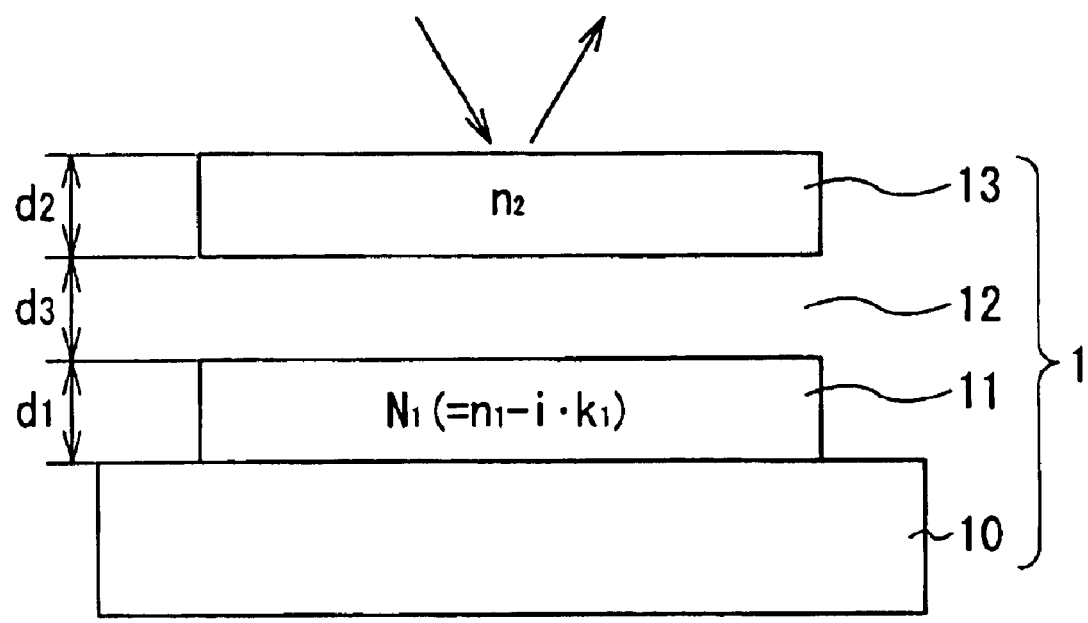
FIG. 1 is a cross sectional view showing a configuration of an optical multilayer structure according to an embodiment of the invention when a gap portion is "λ/4"
Figure 2:
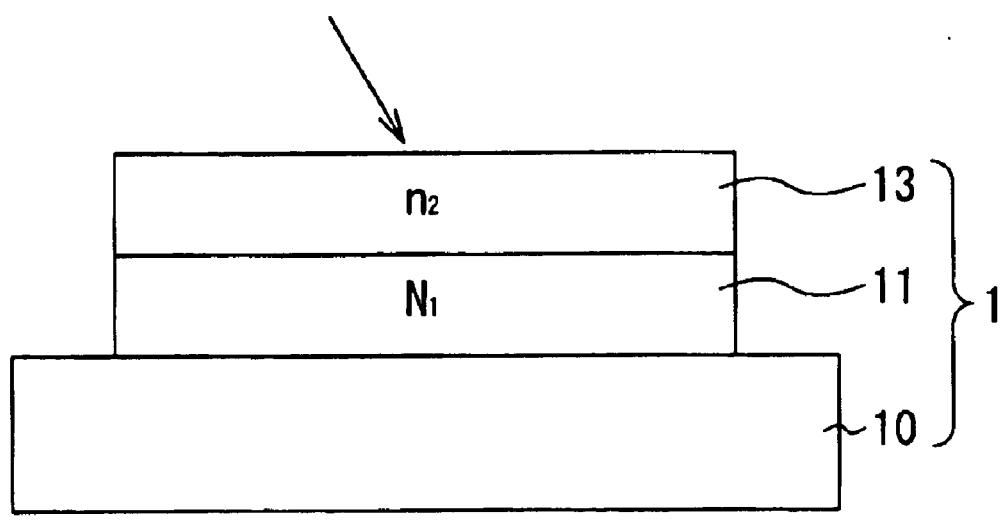
FIG. 2 is a cross sectional view showing a configuration of the optical multilayer structure shown in FIG. 1 when the gap portion is "0"

FIGS. 1 and 2 show a fundamental configuration of an optical multilayer structure 1 according to an embodiment of the invention. FIG. 1 shows a state of high reflection as a gap portion 12 to be described later exists in the optical multilayer structure 1, and FIG. 2 shows a state of low reflection as the gap portion 12 of the optical multilayer structure 1 does not exist. More specifically, the optical multilayer structure 1 is used as, for example, an optical switching device, and a plurality of the optical switching devices one-dimensionally or two-dimensionally arranged can constitute an image display apparatus. Further, as will be described in more detail later, when the optical multilayer structure 1 is fixed with the configuration as shown in FIG. 2, the optical multilayer structure 1 can be used as an antireflective film.

The optical multilayer structure 1 comprises a first layer 11 being adjacent to a substrate 10 and being light-absorptive, the gap portion 12 having as large a size as a light interference phenomenon can occur and being capable of varying the size, and a second layer 13 being transparent disposed in this order on the substrate 10.

In the embodiment, where a complex refractive index of the first layer 11 is $N_1$ (=$n_1$–i·$k_1$, $n_1$ is a refractive index, $k_1$ is an extinction coefficient, and i is an imaginary unit), a refractive index of the second layer 13 is $n_2$, and a refractive index of an incident medium is 1.0, the optical multilayer structure 1 is configured so as to satisfy a relationship of Mathematical Formula 2. A significance of the formula will be described later.

$$\left(n_1 - \frac{n_2^2 + 1}{2}\right)^2 + k_1^2 - \left(\frac{n_2^2 - 1}{2}\right)^2 = 0 \quad \text{(Mathematical Formula 2)}$$

The substrate 10 may be formed of an opaque and light-absorptive material, for example, nonmetal such as carbon (C) and graphite (black lead), metal such as tantalum (Ta), metal oxide such as chromium oxide (CrO), metal nitride such as titanium nitride ($TiN_x$), carbide such as silicon carbide (SiC), a semiconductor such as silicon (Si), or a thin film formed of one of these light-absorptive materials on a transparent substrate. Further, the substrate 10 may be formed of, for example, a transparent material such as glass and plastic, or a semi-transparent material with a low value of the extinction coefficient k.

The first layer 11 is a light-absorptive layer, and is formed of a nitride material, for example, titanium nitride ($TiN_x$), tantalum nitride ($TaN_x$), hafnium nitride ($HfN_x$) or zirconium nitride ($XrN_x$).

The second layer 13 is formed of a transparent material, for example, titanium oxide ($TiO_2$) ($n_2$-2.4), silicon nitride ($Si_3N_4$) ($n_2$=2.0), zinc oxide (ZnO) ($n_2$-2.0), niobium oxide ($Nb_2O_5$) ($n_2$-2.2), tantalum oxide ($Ta_2O_5$) ($n_2$-2.1), silicon oxide (SiO) ($n_2$2.0), tin oxide ($SnO_2$) ($n_2$-2.0), ITO (indium-tin oxide) ($n_2$=2.0) or the like.

Further, the second layer 13 functions as a moving part, which will be described later, in a switching operation, so specifically the second layer 13 is preferably formed of a tough material with a high Young's modulus such as $Si_3N_4$. Moreover, when the switching operation is driven by static electricity, a transparent conductive film made of ITO or the like may be included in a portion of the second layer 13. The refractive indices of $Si_3N_4$ and ITO are equivalent, so each thickness thereof is freely set. In addition, when the first layer 11 and the second layer 13 come into contact with each other, in order to avoid a short circuit during the contact, it is preferable that a portion of the second layer 13 on a side closer to the substrate is formed of $Si_3N_4$, and a portion of the second layer 13 on a side closer to the incident medium is formed of ITO.

A physical thickness $d_1$ of the first layer 11 is determined by a wavelength of incident light and values of n and k of its material. In the embodiment, the thickness $d_1$ is as large as optical information of the substrate 10 becomes invisible. The reason and a specific thickness of each material will be described later.

An optical thickness $n_2 \cdot d_2$ of the second layer 13 is "$\lambda/4$" ($\lambda$ is a designed wavelength of incident light) or less.

Incidentally, "$\lambda/4$" in the description is not necessarily strictly "$\lambda/4$", and it may be a value near "$\lambda/4$". It is because, for example, when either of the layers has an optical thickness larger than $\lambda/4$, the optical thickness of the other layer can be complemented by reducing the thickness by an excess amount over $\lambda/4$, and when the refractive index is deviated from the above Mathematical Formula 2, the refractive index may be adjustable by the thickness. Therefore, in the description, an expression of "$\lambda/4$" also implies the meaning of "approximately $\lambda/4$".

The first layer 11 and the second layer 13 may composite layers including two or more layers with different optical properties from each other. In this case, however, the composite layer is required to have an optical property (optical admittance) equivalent to that in the case of a single layer.

An optical size (a space between the first layer 11 and the second layer 13) of the gap portion 12 is set to be variable by a driving means which will be described later. A medium embedded in the gap portion 12 may be a gas or a liquid, as long as the medium is transparent. As the gas, air (a refractive index $n_D$ at a sodium D line (589.3 nm) is 1.0), nitrogen ($N_2$) ($n_D$=1.0) and so on are cited, and as the liquid, water ($n_D$=1.333), silicon oil ($n_D$=1.4 to 1.7), ethyl alcohol ($n_D$=1.3618), glycerin ($n_D$=1.4730), diiodomethane ($n_D$=1.737) and so on are cited. Further, the gap portion 12 can be in a vacuum.

The optical size of the gap portion 12 is varied in a binary or continuous manner between "an odd multiple of $\lambda/4$" and "an even multiple (including 0) of $\lambda/4$". Thereby, an amount of reflection, transmission or absorption of the incident light is varied in a binary or continuous manner. As in the case of the thicknesses of the first layer 11 and the second layer 13, even if the optical size of the gap portion 12 is deviated from a multiple of $\lambda/4$ to some degree, the optical size of the gap portion 12 can be complemented by a variation in the thickness or the refractive index of any other layer, so an expression of "$\lambda/4$" also implies a meaning of "approximately $\lambda/4$".

Figure 3A:
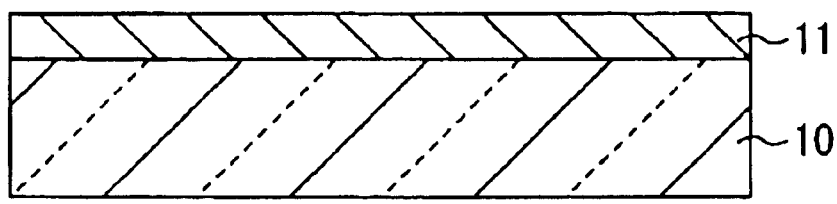
FIGS. 3A through 3D are cross sectional views for describing steps of manufacturing the optical multilayer structure shown in FIG. 1.
Figure 3B:
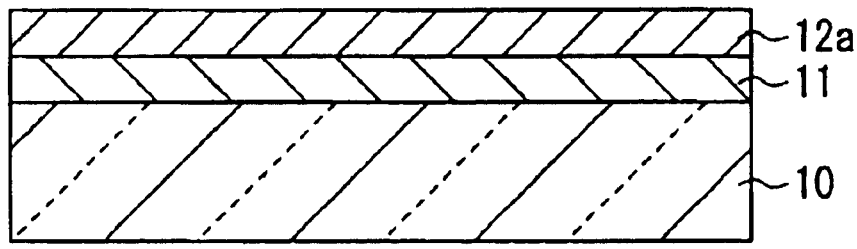
Figure 3C:
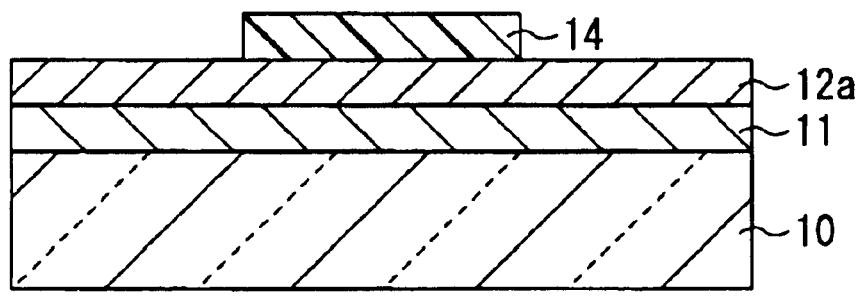
Figure 3D:
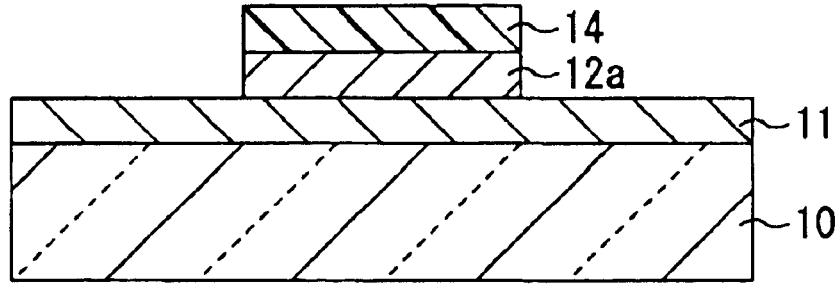

The optical multilayer structure 1 having such gap portion 12 can be manufactured through steps shown in FIGS. 3A through 4C. At first, as shown in FIG. 3A, the first layer 11 made of $TaN_x$ is formed on the substrate 10 made of, for example, glass through, for example, sputtering, and then as shown in FIG. 3B, an amorphous silicon (a-Si) film 12a as a sacrificial layer is formed through, for example, CVD (chemical vapor deposition). Next, as shown in FIG. 3C, a photoresist film 14 having a pattern shape of the gap portion 12 is formed, and as shown in FIG. 3D, the amorphous silicon (a-Si) film 12a is selectively removed through, for example, RIE (reactive ion etching) by the use of the photoresist film 14 as a mask.

Figure 4A:
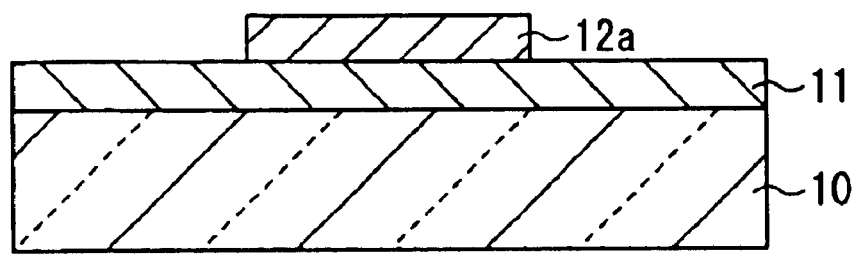
FIGS. 4A through 4C are cross sectional views for describing steps following the step of FIG. 3D.
Figure 4B:
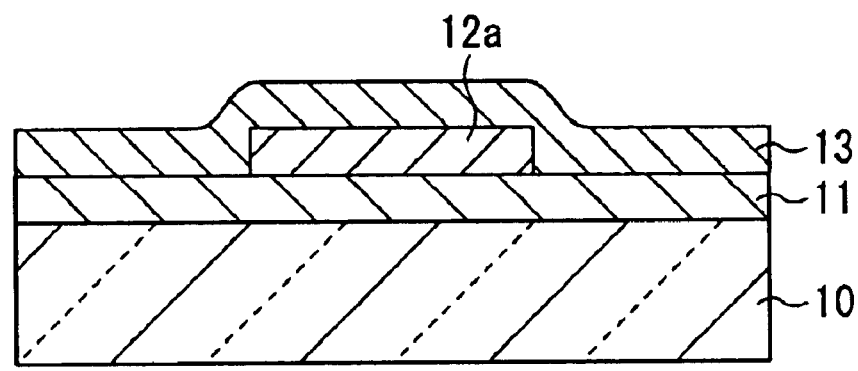
Figure 4C:
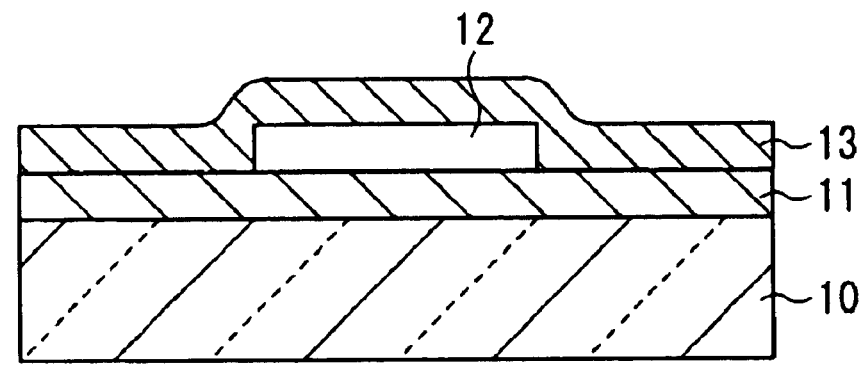

Then, as shown in FIG. 4A, after removing the photoresist film 14, as shown in FIG. 4B, the second layer 13 made of $Si_3N_4$ is formed through, for example, CVD. Next, as shown in FIG. 4C, the amorphous silicon (a-Si) film 12a is removed through dry etching using xenon difluoride ($XeF_2$) or the like. Thereby, the optical multilayer structure 1 having the gap portion 12 can be manufactured.

The optical multilayer structure 1 according to the embodiment varies the optical size of the gap portion 12 between an odd multiple of $\lambda/4$ and an even multiple (including 0) of $\lambda/4$ (for example, between "$\lambda/4$" and "0") in a binary or continuous manner so as to vary an amount of reflection, transmission or absorption of incident light.

Next, referring to FIGS. 1 and 5, the significance of the above-described Mathematical Formula 2 will be described below.

A filter property of the above optical multilayer structure 1 can be described by optical admittance. Optical admittance y has the same value as the complex refractive index N (=n–i·k, n is a refractive index, k is an extinction coefficient, and i is an imaginary unit). For example, the admittance of air is y (air)=1 and n (air)=1, and the admittance of glass is y (glass)=1.52 and n (glass)=1.52.

Figure 5:
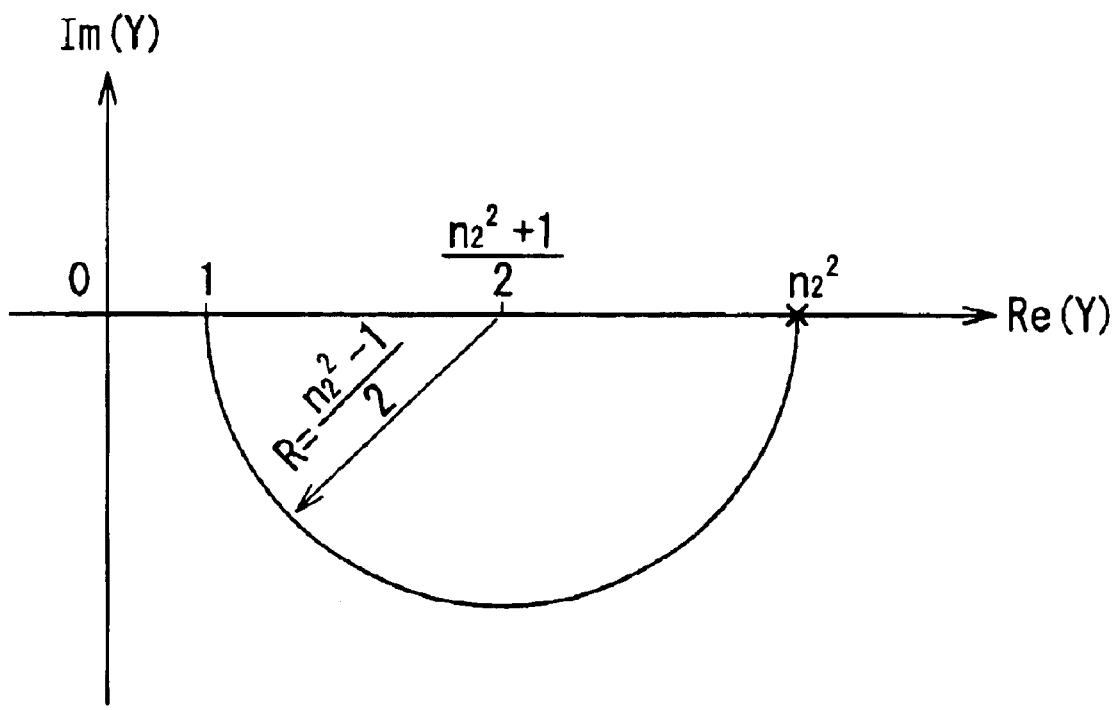
FIG. 5 is an illustration showing a locus where a second layer being transparent and having a refractive index of $n_2$ passes through a point of (1, 0) (admittance of air) on an optical admittance diagram.

When a locus where the second layer which is transparent and has a refractive index of $n_2$ passes through a point of (1, 0) on an optical admittance diagram is drawn, the locus is as shown in FIG. 5. In other words, the locus passes through 1 and $n_2^2$ on a real axis Re(Y), and forms an arc with $(n_2^2+1)/2$ as a center. In this case, when the first layer 11 is formed with as large a thickness as the optical information of the substrate 10 becomes invisible on the substrate 10, the first layer 11 has a role optically equivalent to the substrate 10. When the optical admittance (=the complex refractive index $(n_1-i \cdot k_1)$) of the material of the first layer 11 falls substantially on the arc, the complex admittance of the first layer 11 and the second layer 13 is moved from the optical admittance of the first layer 11. Then, the second layer 13 is formed with as large a thickness as the complex admittance becomes 1. Thus, reflection becomes 0 at the designed wavelength. A relationship between an optical constant of the material of the substrate 10 or the first layer and an optical constant of the material of the second layer 13 in order to satisfy such condition is as shown in the above-described Mathematical Formula 2. However, by disposing a material with a different optical constant with an extremely thin thickness, the complex admittance may resolve to 1, so there may be cases where Mathematical Formula 2 is not necessarily perfectly satisfied. Therefore, it is sufficient if Mathematical Formula 2 is substantially satisfied.

In other words, in the optical multilayer structure 1, when a space for the gap portion 12 between the first layer 11 and the second layer 13 is "0", the optical multilayer structure 1 becomes an antireflective film, and when the space is optically approximately $\lambda/4$ at the designed wavelength, it becomes a reflective film. Namely, by the space which is variable between "0" and "$\lambda/4$", an optical switching device which can vary reflectivity between "0" and "70%" or over can be implemented.

Figure 6:
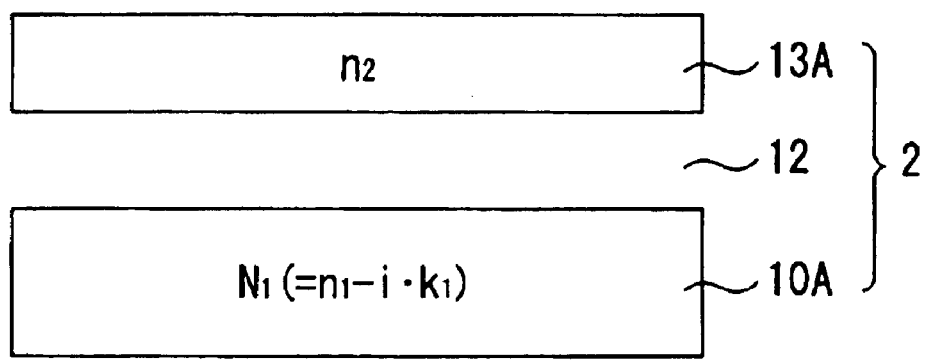
FIG. 6 is an illustration showing a modification of the optical multilayer structure shown in FIG. 1.

Moreover, when the substrate 10 has the complex refractive index of the first layer, an optical multilayer structure 2 without the first layer as shown in FIG. 6 can be implemented. In the optical multilayer structure 2, where a complex refractive index of a substrate 10A is $N_1$ (=$n_1-i \cdot k_1$, $n_1$ is a refractive index, $k_1$ is an extinction coefficient, and i is an imaginary unit), a refractive index of a transparent layer 13A (corresponding to the second layer 13) is $n_2$, and a refractive index of an incident medium is 1.0, the optical multilayer structure 2 is configured so as to satisfy the relationship of Mathematical Formula 2.

As a combination of materials of such optical multilayer structure, any materials which satisfy the above restrictions can be used, so flexibility in selection of the materials is wide. Table 1 shows some examples of the materials. Further, the values of tantalum nitride and ITO are values actually measured by the inventors after films of tantalum nitride and ITO were actually formed by the inventors, and the values of $Si_3N_4$ are typical values.

In this case, a $TaN_x$ layer as the first layer 11, an air layer (n=1.00) as the gap portion 12 and a laminate film (complex refractive index $n_2$=2.0, k=0) including a $Si_3N_4$ film and an ITO film as the second layer 13 are used. The $TaN_x$ layer has as large a thickness as 400 nm. The designed wavelength is 550 nm, and at the wavelength, the optical property of $TaN_x$ of the first layer 11 substantially satisfy Mathematical Formula 2. As the refractive indices of $Si_3N_4$ and ITO are approximately 2.0, that is, substantially equivalent to each other, it is sufficient if the second layer 13 has a thickness of 60 nm in total. In this case, an upper layer made of ITO has a thickness of 20 nm, and a lower layer made of $Si_3N_4$ has a thickness of 40 nm.

Figure 7:
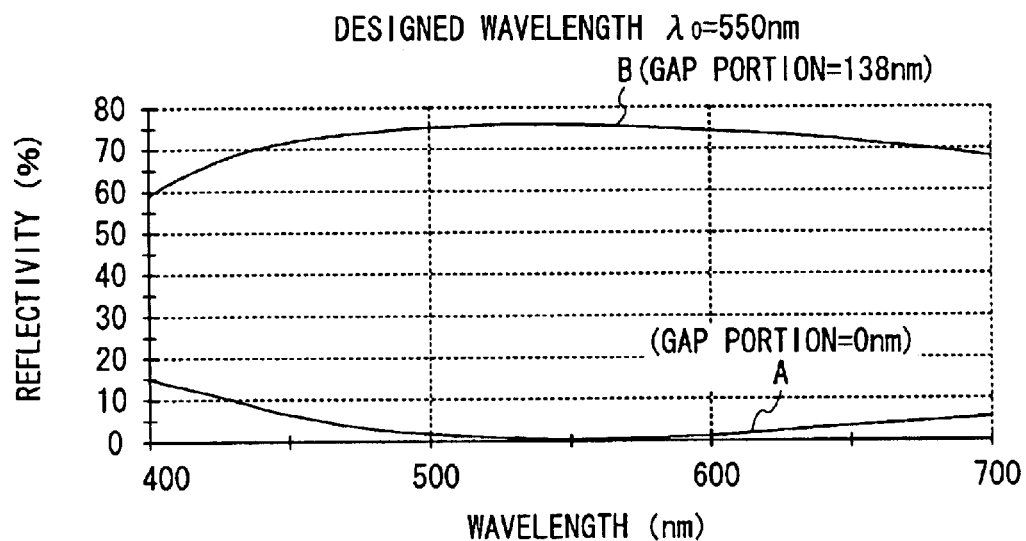
FIG. 7 is a graph showing a reflection property of a specific example of the optical multilayer structure shown in FIG. 1.
Figure 8:
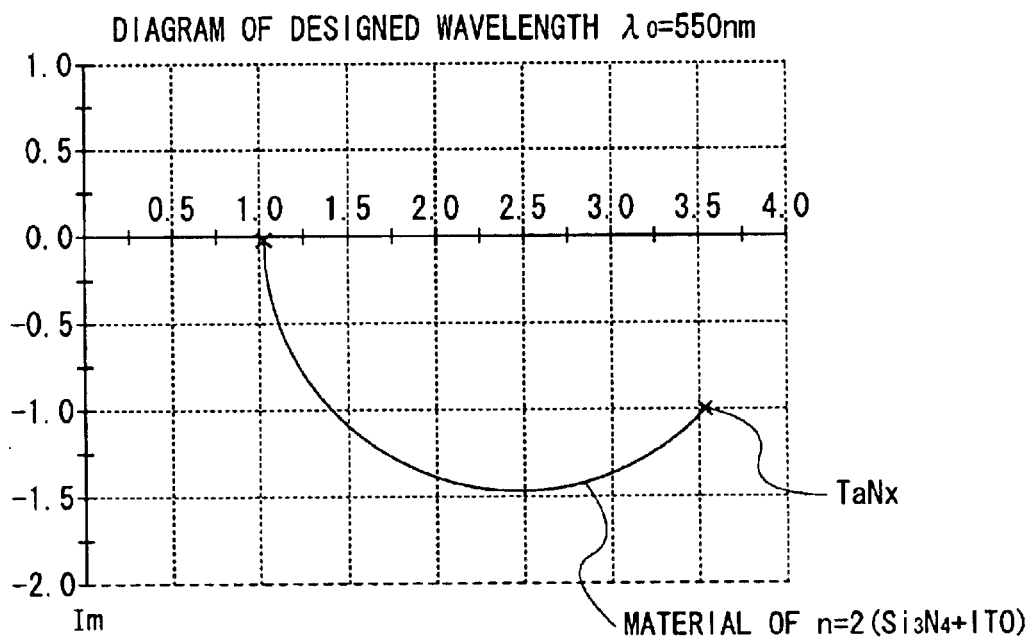
FIG. 8 is a diagram for describing an optical admittance at low reflection in the example of FIG. 7.

FIG. 7 shows a result of simulating a relationship between the wavelength of the incident light (the designed wavelength of 550 nm) and reflectivity in such configuration of the optical multilayer structure. In this case, lines A and B indicate properties of the optical multilayer structure in the case where the gap portion (air layer) has an optical thickness of "0" (lower reflection side) and in the case where the gap portion has an optical thickness of "$\lambda/4$" (138 nm) (higher reflection side), respectively. Further, FIG. 8 shows a complex optical admittance diagram at lower reflection, and it can be seen that the complex optical admittance is terminated in proximity to 1.0. As the material of the first layer 11 satisfying such condition, as described above, nitride is preferable. As an example of nitride, tantalum nitride is as shown in Table 1. Further, the values of n and k of nitride can be adjusted to some degree depending upon a film formation condition, and titanium nitride ($TiN_x$), hafnium nitride ($HfN_x$), zirconium nitride ($ZrN_x$) or the like satisfies the condition. Table 2 shows the values of n and k of HfN, $TaN_x$ and TiN at each wavelength and measures of thicknesses of HfN, $TaN_x$ and TiN which are as large as the optical information of the substrate 10 becomes invisible as examples.

Thus, in the embodiment, in a visible light range of, for example, 550 nm, the reflectivity at lower reflection can be nearly 0, and the reflectivity at higher reflection can be 70% or over, so high contrast modulation can be performed. Moreover, the configuration of the optical multilayer structure 1 is simple, so the optical multilayer structure 1 can be more easily manufactured than a diffraction grating configuration such as GLV and a complicated three-dimensional configuration such as DMD. Further, the GLV requires six grating ribbons per pixel, however, in the embodiment, only one ribbon is required, so the configuration of the optical multilayer structure 1 is simpler, and the optical multilayer structure 1 can be manufactured in a smaller size. In addition, a moving range of the moving part is "$\lambda/2$" at most, so high-speed response at a level of 10 ns can be achieved. Therefore, when the optical multilayer structure 1 is used for a light valve for display application, a simple configuration of a one-dimensional array as will be described later can be implemented.

Moreover, the optical multilayer structure 1 according to the embodiment is essentially different from a narrow band pass filter with such a configuration that the gap portion is sandwiched with metal thin films or reflective layers, that is, a Fabry-Perot type filter, so the bandwidth of a lower reflection band can be widened. Thereby, a relatively large margin for film thickness control during manufacturing can be obtained, so flexibility in design will be increased.

Further, in the embodiment, as it is sufficient if the refractive indices of the substrate 10 and the first layer 11 are any given values within a certain range, flexibility in selection of materials can be increased. In addition, when the substrate 10 is formed of an opaque material, the incident light is absorbed by the substrate 10 at lower reflection, so there is no worry that stray light or the like will occur.

Moreover, the same applicant has been proposed an optical multilayer structure comprising a first layer being light-absorptive, a gap portion having as large a size as a light interference phenomenon can occur and being capable of varying the size, and a second layer disposed on a substrate (in Japanese Patent Application No. 2000-219599). The optical multilayer structure has a simple configuration and flexibility in selection of materials, and can response with high speed in a visible light range, so the optical multilayer structure can be preferably used for an image display apparatus or the like. However, in order to implement the optical multilayer structure, the thickness of the first layer (conductive layer) is limited to as small as approximately 10 nm. When the conductive layer has as small a thickness as this amount, electric resistance may increase in some cases. On the other hand, in the embodiment, the first layer (conductive layer) has as large a thickness as the optical information of the substrate becomes invisible, so the electric resistance is reduced, thereby reliability as wiring is improved.

As described above, by the use of the optical multilayer structure 1 according to the embodiment, an optical switching device and an image display apparatus which are high-speed and compact, and have improved reliability can be implemented. The description about them will be given later.

Figure 9:
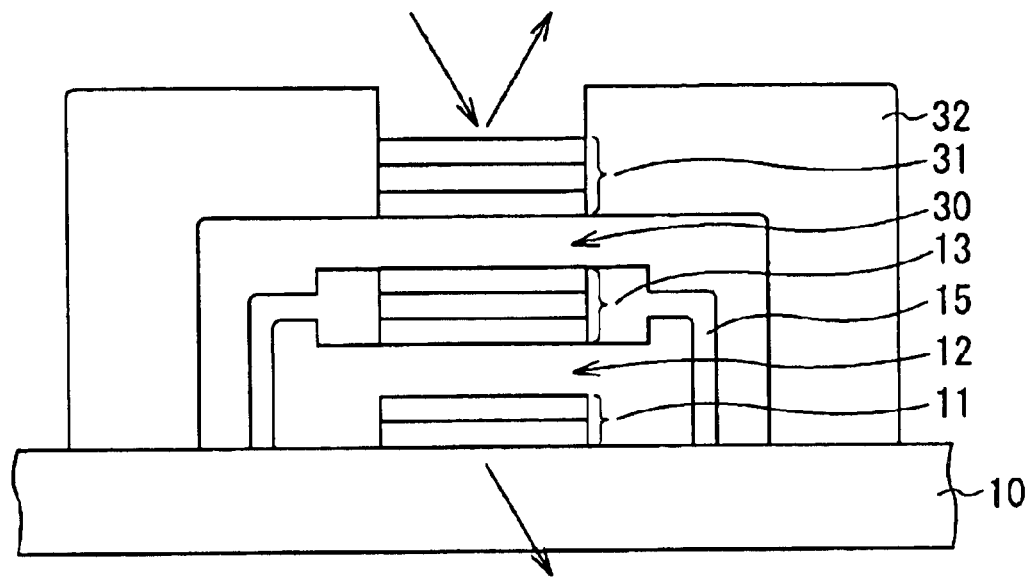
FIG. 9 is a cross sectional view for describing another modification of the optical multilayer structure shown in FIG. 1.

In the embodiment, the gap portion of the optical multi-layer structure 1 is a single layer, but the gap portion may include a plurality of layers, for example, two layers as shown in FIG. 9. In this case, the first layer 11, a first gap portion 12, the second layer 13, a second gap portion 30 and a third transparent layer 31 are disposed in this order on the substrate 10, and then the second layer 13 and the third transparent layer 31 are supported by supports 15 and 32 made of, for example, silicon nitride, respectively.

In the optical multilayer structure, the second layer 13 in the middle is displaced up or down so that when either of the first gap portion 12 or the second gap portion 30 is narrowed, the other gap portion is widened accordingly, and thereby a reflection property will vary.

[Driving Method]

Next, a specific means for varying the size of the gap portion 12 in the optical multilayer structure 1 will be described below.

Figure 10:
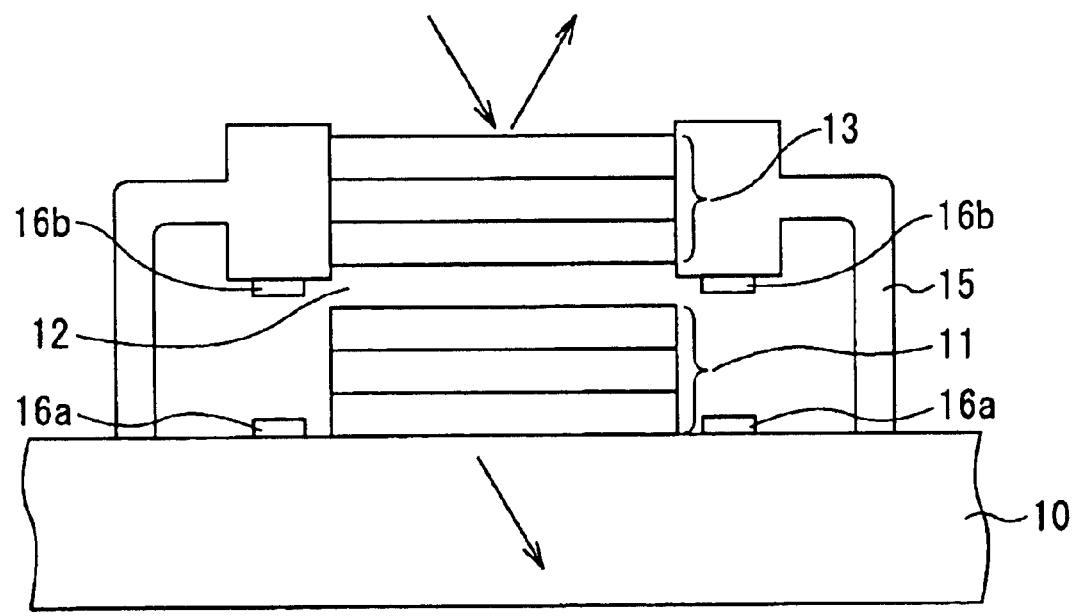
FIG. 10 is a cross sectional view for describing a method of driving the optical multilayer structure by static electricity.

FIG. 10 shows an example of driving the optical multi-layer structure by static electricity. The optical multilayer structure comprises electrodes 16a and 16a made of, for example, aluminum on the both sides of the first layer 11 on the transparent substrate 10, and the second layer 13 is supported by the support 15 made of, for example, silicon nitride ($Si_3N_4$), and electrodes 16b and 16b are formed on the support 15 in positions facing the electrodes 16a and 16a.

In the optical multilayer structure, the optical thickness of the gap portion 12 is switched between, for example, "λ/4" and "0" or "λ/4" and "λ/2" in a binary manner by electrostatic attraction generated by a potential difference through applying voltage to the electrodes 16a, 16a, 16b and 16b. In addition, by continuously varying application of voltage to the electrodes 16a, 16a, 16b and 16b, the size of the gap portion 12 can be continuously varied within a range of a certain value so that the amount of reflection, transmission or absorption of the incident light can be continuously (in an analog fashion) varied.

Figure 11:
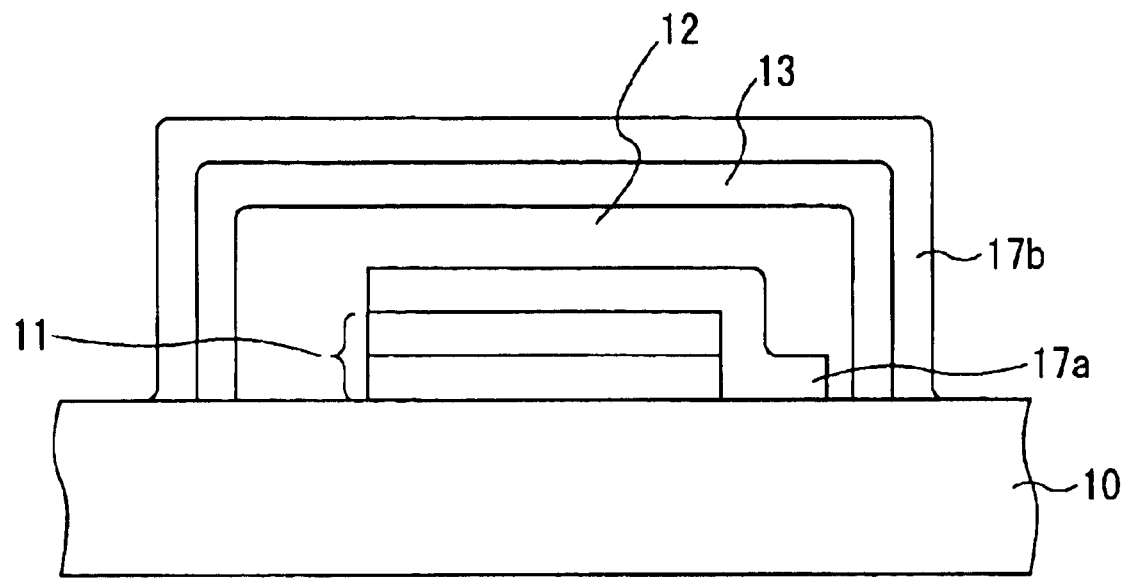
FIG. 11 is a cross sectional view for describing another method of driving the optical multilayer structure by static electricity.
Figure 12:
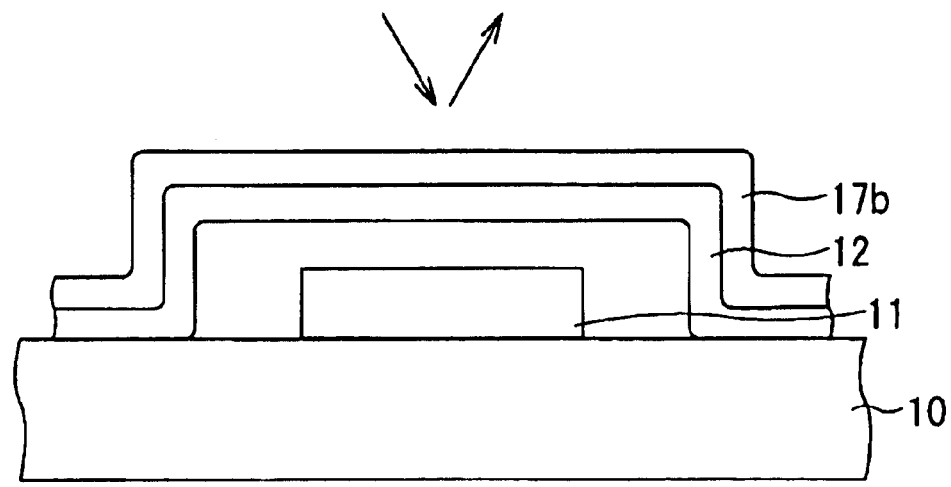
FIG. 12 is a cross sectional view for describing a still another method of driving the optical multilayer structure by static electricity.

Other methods shown in FIGS. 11 and 12 may be used to drive the optical multilayer structure by static electricity. The optical multilayer structure 1 shown in FIG. 11 comprises a transparent conductive film 17a made of, for example, ITO (indium-tin oxide) on the first layer 11 disposed on the transparent substrate 10, and the second layer 13 made of, for example, $SiO_2$ is formed in a bridging configuration, and a transparent conductive film 17b made of ITO is disposed on an external surface of the second layer 13.

In the optical multilayer structure, the electrostatic attraction generated by a potential difference through applying voltage between the transparent conductive films 17a and 17b allows the optical thickness of the gap portion 12 to be switched.

In the optical multilayer structure shown in FIG. 12, instead of the transparent conductive film 17a in the optical multilayer structure shown in FIG. 11, for example, a tantalum (Ta) film as the first layer 11 with conductivity is disposed.

Figure 13A:
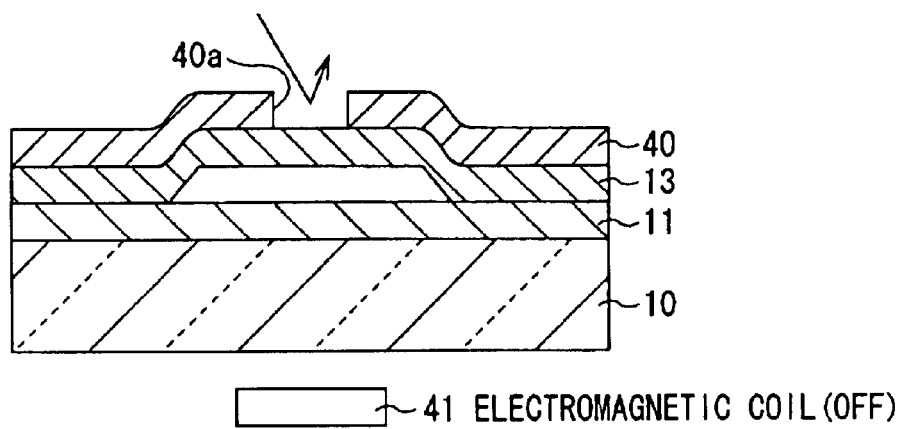
FIGS. 13A and 13B are cross sectional views for describing a method of driving the optical multilayer structure by a magnetic force.
Figure 13B:
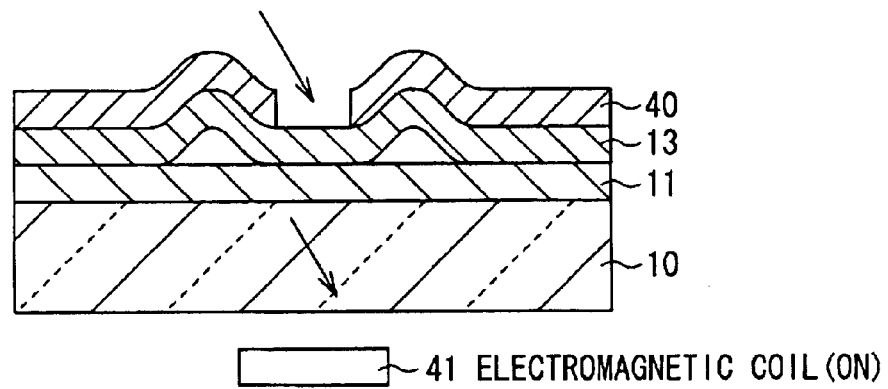

As the method of driving the optical multilayer structure, in addition to the method using the static electricity, various methods such as using a micro machine such as a toggle mechanism and a piezo-electric device, a magnetic force, or a shape-memory alloy can be considered. FIGS. 13A and 13B show a driving method using a magnetic force. In the optical multilayer structure, a magnetic layer 40 made of a magnetic material such as cobalt (Co) with an aperture is disposed on the second layer 13, and an electromagnetic coil 41 is disposed on a bottom portion of the substrate 10. A space for the gap portion 12 is switched between, for example, "λ/4" (refer to FIG. 13A) and "0" (refer to FIG. 13B) by on/off switching of the electromagnetic coil 41, so that the reflectivity can be varied.

[Optical Switching Apparatus]

Figure 14:
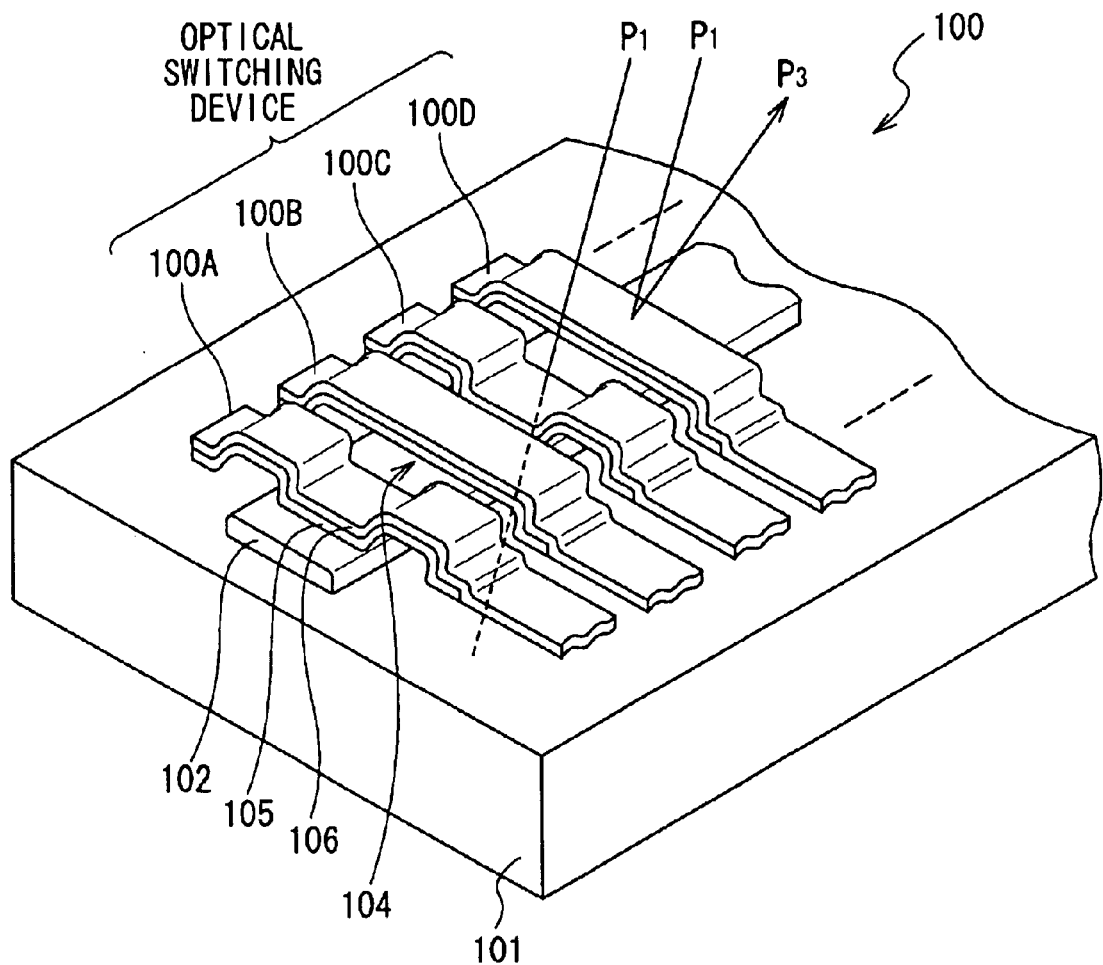
FIG. 14 is an illustration showing a configuration of an example of an optical switching apparatus.

FIG. 14 shows a configuration of an optical switching apparatus 100 using the above optical multilayer structure 1. The optical switching apparatus 100 comprises a plurality (four in the drawing) of optical switching devices 100A through 100D disposed on a substrate 101 made of, for example, glass in a one-dimensional array. It is not limited to the one-dimensional array, and the optical switching devices may be two-dimensionally arranged. In the optical switching apparatus 100, for example, a $TaN_x$ film 102 is formed along one direction (direction of an device array) on a surface of the substrate 101. The $TaN_x$ film 102 corresponds to the first layer 11 in the above-described embodiment.

On the substrate 101, a plurality of $Si_3N_4$ films 105 are disposed in a direction orthogonal to the $TaN_x$ film 102. An ITO film 106 is formed on the outside of the $Si_3N_4$ film 105 as a transparent conductive film. The ITO film 106 and the $Si_3N_4$ film 105 correspond to the second layer 13 in the above-described embodiment, and they have a bridging configuration in a position where they stride the $TaN_x$ film 102. A gap portion 104 with a size varying depending upon a switching operation (on/off) is disposed between the $TaN_x$ film 102 and the ITO film 106. The optical thickness of the gap portion 104 varies between, for example, "λ/4" (137.5 nm) and "0" at the wavelength (λ=550 nm) of the incident light.

Figure 15:
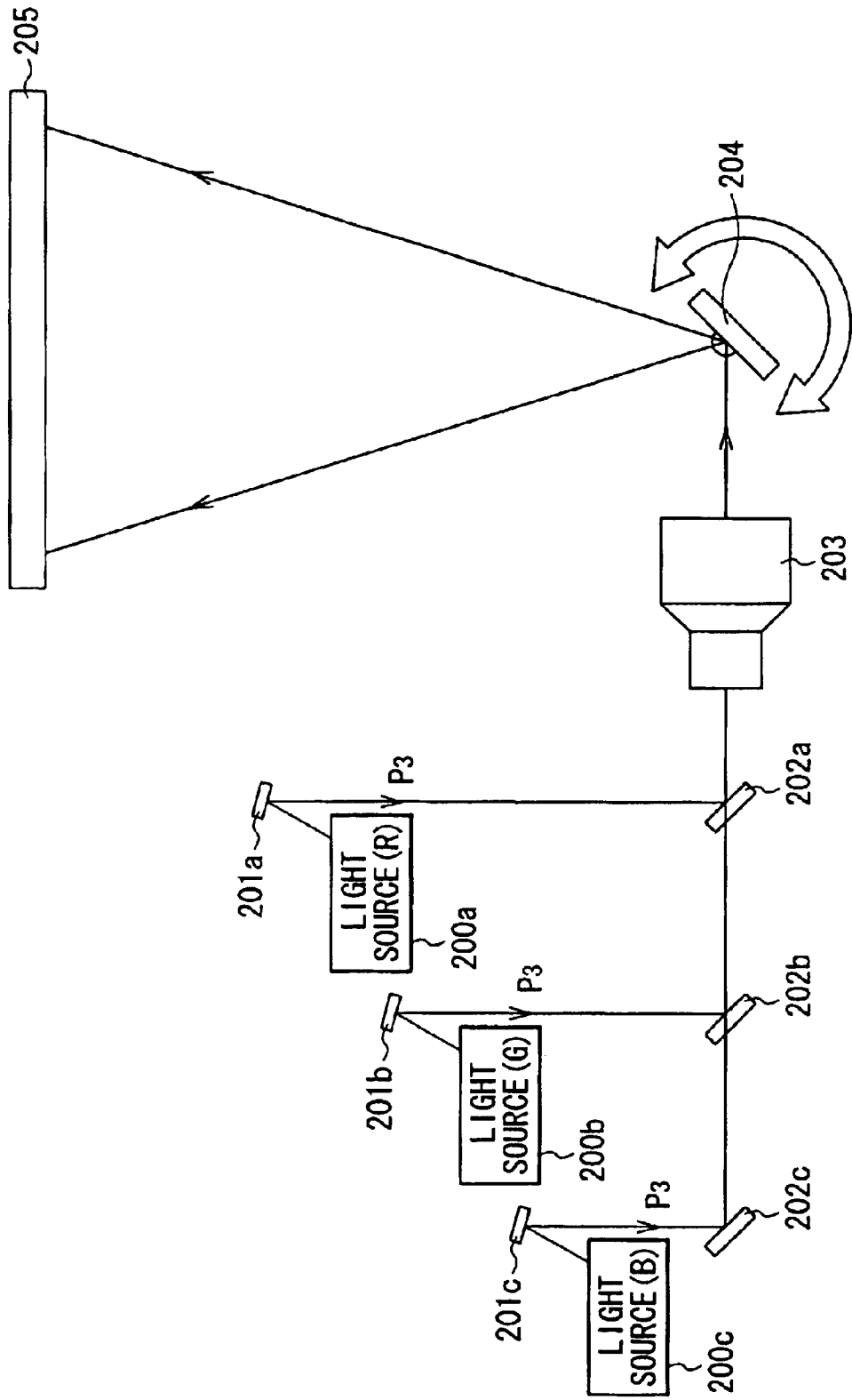
FIG. 15 is an illustration showing a configuration of an example of a display.

The optical switching devices 100A through 100D switch the optical thickness of the gap portion 104 between, for example, "λ/4" and "0" by electrostatic attraction generated by a potential difference through applying voltage to the $TaN_x$ film 102 and the ITO film 106. In FIG. 15, the optical switching devices 100A and 100C indicate that the gap portion 104 is in a state of "0" (that is, a state of lower reflection), and the optical switching devices 100B and 100D indicate that the gap portion 104 is in a state of "λ/4" (that is, a state of higher reflection). The $TaN_x$ film 102, the ITO film 106 and a voltage application apparatus (not shown) constitutes "a driving means" in the invention.

In the optical switching apparatus 100, when the $TaN_x$ film 102 is grounded to have a potential of 0 V, and a voltage of, for example, +12 V is applied to the ITO film 106 formed on a side of the second layer, electrostatic attraction is generated between the $TaN_x$ film 102 and the ITO film 106 by a potential difference thereof, and then in FIG. 14, like the optical switching devices 100A and 100C, the first layer and the second layer come into contact with each other so that the gap portion 104 falls in a state of "0". In the state, incident light $P_1$ passes through the above multilayer structure, and then is absorbed by a substrate 101.

Next, when the transparent conductive film 106 on the side of the second layer is grounded to have a potential of 0 V, electrostatic attraction between the TaN$_x$ film 102 and the ITO film 106 is eliminated, so in FIG. 14, like the optical switching devices 100B and 100D, the first layer and the second layer are separated each other so that the gap portion 12 falls in a state of "λ/4". In the state, the incident light P$_1$ is reflected so as to become reflected light P$_3$.

Thus, in the embodiment, each of the optical switching devices 100A through 100D switches the gap portion in a binary manner by an electrostatic force so that the incident light P$_1$ is switched in a binary manner between a state where no reflected light exists and a state where reflected light P$_3$ is generated so as to be extracted. As described above, continuously varying the size of the gap portion allows the incident light P$_1$ to be continuously switched from the state where no reflected light exists to the state the reflected light P$_3$ is generated.

In the optical switching devices 100A through 100D, a distance where the moving part must move is approximately "λ/2 (or λ/4)" of the incident light at maximum, so the response speed is as high as approximately 10 ns, which is sufficient. Therefore, the light valve for display can be implemented with a one-dimensional array configuration.

In addition, in the embodiment, when a plurality of optical switching devices are allocated per pixel, each of the devices can be independently driven, so when the optical switching devices display a gray scale of an image as an image display apparatus, the gray scale can be displayed not only by time division but also by area.

[Image Display Apparatus]

FIG. 15 shows a configuration of a projection display as an example of the image display apparatus using the above optical switching apparatus 100. In this case, a description will be given of an example of using the reflected light P$_3$ from the optical switching devices 100A through 100D so as to display an image.

The projection display comprises light sources 200a, 200b and 200c which are lasers of red (R), green (G), and blue (B), respectively, optical switching device arrays 201a, 201b, and 201c disposed corresponding to each light source, dichroic mirrors 202a, 202b and 202c, a projection lens 203, a galvano mirror 204 as a uniaxial scanner, and a projection screen 205. The primary colors of red, green and blue may be replaced with cyan, magenta and yellow. In each of the switching device arrays 201a, 201b and 201c, a plurality, for example, 1000 of the above switching devices for a required amount of pixels are one-dimensionally arranged in a direction vertical to a paper plane to constitute the light valve.

In the projection display, R, G and B lights emitted from the light sources 200a, 200b and 200c enter into the optical switching device arrays 201a, 201b and 201c, respectively. Further, it is preferable that in order to have no influence of polarization, an incident angle is set at as close to 0 as possible so as to vertically enter the lights. The reflected light P3 from each of the optical switching devices is focused on the projection lens 203 by the dichroic mirrors 202a, 202b and 202c. The lights focused on the projection lens 203 are scanned by the galvano mirror 204 so as to be projected as a two-dimensional image on the projection screen 205.

Thus, in the projection display, a plurality of optical switching devices are one-dimensionally arranged to emit the R, G and B lights, and the lights after switching are scanned by an uniaxial scanner to display a two-dimensional image.

Moreover, in the embodiment, the reflectivity at lower reflection can be 0.1% or less, and the reflectivity at higher reflection can be 70% or over, so a high contrast of approximately 1000 to 1 can be displayed. Further, as a reflection property can be acquired at a position where the lights vertically enter into the devices, an optical system can be assembled with a simpler configuration without consideration of polarization or the like.

Figure 16:
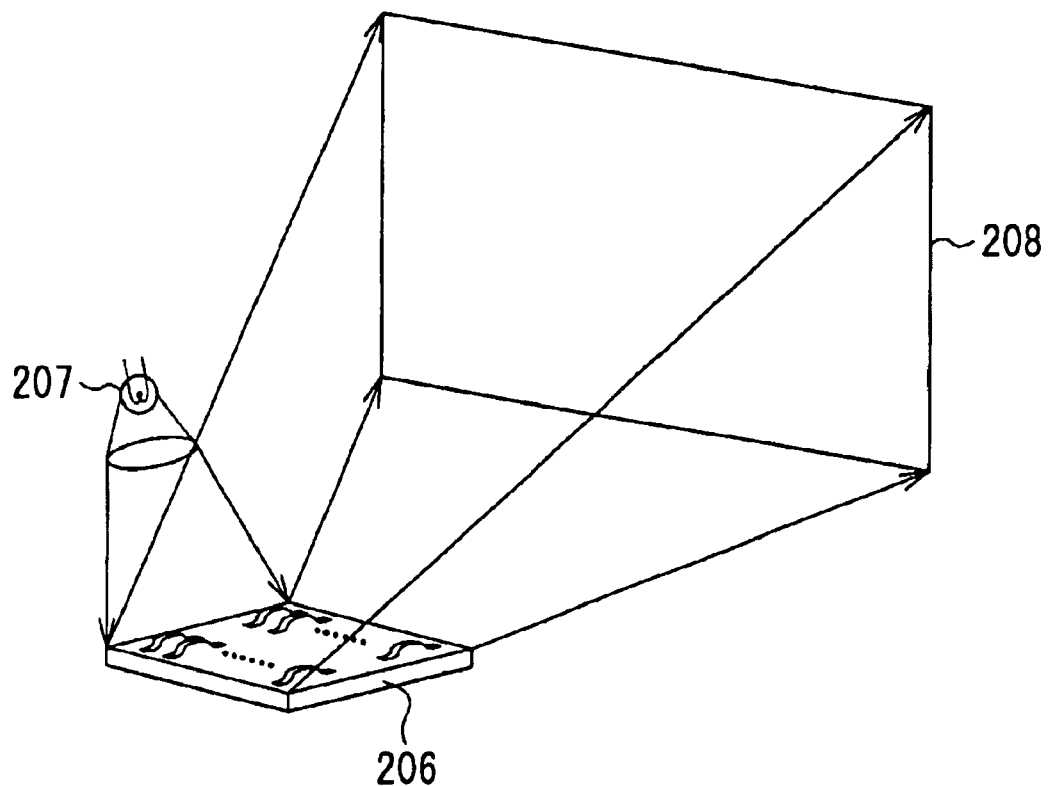
FIG. 16 is an illustration showing another example of the display.

Although the present invention is described referring to the preferred embodiments, the invention is not limited to the embodiments, and is applicable to various modifications. For example, in the embodiment, the display with such a configuration that a laser is used as a light source to scan a one-dimensional array light valve is described, although as shown in FIG. 16, a display can have such a configuration that a two-dimensionally arranged optical switching apparatus 206 is irradiated with a light from a white light source 207 so as to display an image on a projection screen 208.

Figure 17:
FIG. 17 is an illustration of a configuration of a paper-shaped display.

Moreover, in the embodiment, the example that a glass substrate is used as the substrate is described, however, as shown in FIG. 17, a paper-shaped display may use a flexible substrate 209 with a thickness of, for example, 2 mm or less, thereby an image can be directly viewed.

Further, in the embodiment, the example that the optical multilayer structure according to the invention is used for the display is described, however, in addition to the display, the optical multilayer structure is applicable to various devices such as optical printer, for example, for printing an image onto a photoconductor drum.

As described above, according to the optical multilayer structure and the optical switching device of the invention, where the complex refractive index of the first layer or the substrate instead of the first layer is N$_1$ (=n$_1$−i·k$_1$, n$_1$ is a refractive index, k$_1$ is an extinction coefficient, and i is an imaginary unit), the refractive index of the second layer or the transparent layer is n$_2$, and the refractive index of the incident medium is 1.0, the optical multilayer structure and the optical switching device is configured so as to satisfy a specific condition, so the optical multilayer structure and the optical switching device can vary an amount of reflection, transmission or absorption of the incident light through varying the size of the gap portion, and can have a simpler configuration, and carry out high-speed response specifically in a visible light range. Further, when the first layer and the second layer come into contact with each other on the substrate in this order without the gap portion, the first layer and the second layer can be used as an antireflective film. In addition, the thickness of the first layer can be increased, so the electric resistance of the first layer can be reduced, thereby, reliability in wiring is improved.

Moreover, as there is flexibility in selection of the substrate or the first layer, for example, a method of dry etching the sacrificial layer made of Si with XeF$_2$ is applicable as a method of manufacturing the optical multilayer structure so that a device with high aperture can be more easily manufactured.

Further, according to the image display apparatus of the invention, the optical switching devices of the invention are one-dimensionally arranged so as to constitute a one dimensional array optical switching apparatus, and the one dimensional array optical switching apparatus is used to display an image, so a high-contrast can be displayed, and the reflection property can be acquired at a position where the light vertically enters into the device, so the optical system can be assembled with a simpler configuration without consideration of polarization or the like.

Obviously many modifications and variations of the present invention are possible in the light of the above teachings. It is therefore to be understood that within the scope of the appended claims the invention may be practiced otherwise than as specifically described.

TABLE 1

|  | n | k | n | k | n | k | THICKNESS (nm) |
|---|---|---|---|---|---|---|---|
| WAVELENGTH (nm) | 405 | 405 | 546.1 | 546.1 | 632.8 | 632.8 |  |
| TaNx | 3.219 | 1.478 | 3.526 | 1.018 | 3.544 | 0.786 | 400 or over |
| GAP PORTION | 1 | 0 | 1 | 0 | 1 | 0 | 0/138 |
| $Si_3N_4$ | 2 | 0 | 2 | 0 | 2 | 0 | 40 |
| ITO | 2.1 | 0.06 | 2.1 | 0.1 | 2.0 | 0.01 | 20 |

TABLE 2

|  | n | k | n | k | n | k | SUFFICIENT THICKNESS (nm) |
|---|---|---|---|---|---|---|---|
| WAVELENGTH (nm) | 450 | 450 | 550 | 550 | 650 | 650 |  |
| HfN | 0.56 | 1.5 | 0.53 | 2.42 | 0.61 | 3.2 | 150 |
| TaNx | 3.219 | 1.478 | 3.526 | 1.018 | 3.544 | 0.786 | 400 |
| TiN | 1.764 | 0.8754 | 1.2762 | 1.2575 | 1.1651 | 1.6435 | 200 |

What is claimed is:

1. An optical multilayer structure, comprising:
   a configuration including a first layer being light-absorptive, a gap portion with a size between an odd multiple of $\lambda/4$ ($\lambda$ is a wavelength of incident light) and an even multiple (including 0) of $\lambda/4$, the size being variable, and a second layer being transparent disposed in this order on a substrate, wherein a complex refractive index of the first layer is $N_1$ ($=n_1-ik_1$, $n_1$ is a refractive index, $k_1$ is an extinction coefficient, and i is an imaginary unit), a refractive index of the second layer is $n_2$, and a refractive index of an incident medium is 1.0, a relationship of Mathematical Formula 3 is satisfied;

$$(n_1-(n_2^2+1)/2)^2+k_1^2-((n_2^2-1)/2)^2=0. \quad \text{(Mathematical Formula 3)}$$

2. An optical multilayer structure, comprising:
   a configuration including a gap portion with a size between an odd multiple of $\lambda/4$ ($\lambda$ is a wavelenght of incident light) and an even multiple (including 0) of $\lambda/4$, the size being variable, and a transparent layer disposed in this order on a substrate being light-absorptive,
   wherein where a complex refractive index of the substrate is $N_1$ ($=n_1-i\cdot k_1$, $n_1$ is a refractive index, $k_1$ is an extinction coefficient, and i is an imaginary unit), a refractive index of the transparent layer is $n_2$, and a refractive index of an incident medium is 1.0, a relationship of Mathematical Formula 4 is satisfied.

$$\left(n_1 - \frac{n_2^2+1}{2}\right)^2 + k_1^2 - \left(\frac{n_2^2-1}{2}\right)^2 = 0. \quad \text{(Mathematical Formula 4)}$$

3. An optical multilayer structure according to claim 1 or claim 2, wherein
   the substrate is formed of a transparent material or a semi-transparent material.

4. An optical multilayer structure according to claim 1, further comprising:
   a driving means for varying an optical size of the gap portion, wherein
   the driving means varies the size of the gap portion so as to vary an amount of reflection, transmittance or absorption of incident light.

5. An optical multilayer structure according to claim 4, wherein
   the driving means varies the optical size of the gap portion between an odd multiple of $\lambda/4$ and an even multiple (including 0) of $\lambda/4$ in a binary or continuous manner so as to vary the amount of reflection, transmission or absorption of the incident light in a binary or continuous manner.

6. An optical multilayer structure according to claim 1, wherein
   at least one of the first layer or the second layer is a complex layer including two or more layers with different optical properties from each other.

7. An optical multilayer structure according to claim 1, wherein
   the first layer is formed of a nitride material.

8. An optical multilayer structure according to claim 7, wherein
   the nitride material is formed of one selected from the group consisting of titanium nitride, tantalum nitride, hafnium nitride and zirconium nitride.

9. An optical multilayer structure according to claim 4, wherein
   at least one of the first layer or the second layer partially includes a transparent conductive film, and the driving means varies the optical size of the gap portion by an electrostatic force generated by application of voltage to the transparent conductive film.

10. An optical multilayer structure according to claim 9, wherein
    the transparent conductive film is formed of one selected from the group consisting of ITO, $SnO_2$ and ZnO.

11. An optical multilayer structure according to claim 1, wherein
an optical thickness of the second layer is $\lambda/4$ ($\lambda$ is a designed wavelength of incident light) or less.

12. An optical multilayer structure according to claim 4, wherein the driving means varies the optical size of the gap portion by a magnetic force.

13. An optical switching device, comprising:
an optical multilayer structure including a first layer being light-absorptive, a gap portion with a size between an odd multiple of $\lambda/4$ ($\lambda$ is a wavelength of incident light) and an even multiple (including 0) of $\lambda/4$, the size being variable, and a second layer being transparent disposed in this order on a substrate, and a driving means for varying an optical size of the gap portion, wherein a complex refractive index of the first layer is $N_1$ ($=n_1-ik_1$, $n_1$ is a refractive index, $k_1$ is an extinction coefficient, and i is an imaginary unit), a refractive index of the second layer is $n_2$, and a refractive index of an incident medium is 1.0, a relationship of Mathematical Formula 5 is satisfied;

$$(n_1-(n_2{}^2+1)/2)^2+k_1{}^2-((n_2{}^2-1)/2))^2=0. \quad \text{(Mathematical Formula 5)}$$

14. An optical switching device, comprising:
an optical multilayer structure including a gap portion with a size between an odd multiple of $\lambda/4$ ($\lambda$ is a wavelength of incident light) and an even multiple (including 0) of $\lambda/4$, the size being variable, and a transparent layer disposed in this order on a substrate being light-absorptive; and
a driving means for varying an optical size of the gap portion,
wherein where a complex refractive index of the substrate is $N_1$ ($=n_1-i\cdot k_1$, $n_1$ is a refractive index, $k_1$ is an extinction coefficient, and i is an imaginary unit), a refractive index of the transparent layer is $n_2$, and a refractive index of an incident medium is 1.0, a relationship of Mathematical Formula 6 is satisfied.

$$\left(n_1-\frac{n_2^2+1}{2}\right)^2+k_1^2-\left(\frac{n_2^2-1}{2}\right)^2=0. \quad \text{(Mathematical Formula 6)}$$

15. An image display apparatus for displaying a two-dimensional image through irradiating a plurality of optical switching devices one-dimensionally or two-dimensionally arranged with light,
each of the optical switching devices comprising:
an optical multilayer structure including a first layer being light-absorptive, a gap portion with a size between an odd multiple of $\lambda/4$ ($\lambda$ is a wavelength of incident light) and an even multiple (including 0) of $\lambda/4$, the size being variable, and a second layer being transparent disposed in this order on a substrate; and a driving means for varying an optical size of the gap portion, wherein a complex refractive index of the first layer is $N_1$ ($=n_1-ik_1$, $n_1$ is a refractive index, $k_1$ is an extinction coefficient, and i is an imaginary unit), a refractive index of the second layer is $n_2$, and a refractive index of an incident medium is 1.0, a relationship of Mathematical Formula 7 is satisfied:

$$(n_1-(n_2{}^2+1)/2)^2+k_1{}^2-((n_2{}^2-1)/2))^2=0. \quad \text{(Mathematical Formula 7)}$$

16. An image display apparatus for displaying a two-dimensional image through irradiating a plurality of optical switching devices one-dimensionally or two-dimensionally arranged with light,
each of the optical switching devices comprising:
an optical multilayer structure including a gap portion with a size between an odd multiple of $\lambda/4$ ($\lambda$ is a wavelength of incident light) and an even multiple (including 0) of $\lambda/4$, the size being variable, and a transparent layer disposed in this order on a substrate being light-absorptive; and
a driving means for varying an optical size of the gap portion,
wherein where a complex refractive index of the substrate is $N_1$ ($=n_1-i\cdot k_1$, $n_1$ is a refractive index, $k_1$ is an extinction coefficient, and i is an imaginary unit), a refractive index of the transparent layer is $n_2$, and a refractive index of an incident medium is 1.0, a relationship of Mathematical Formula 8 is satisfied $$\left(n_1-\frac{n_2^2+1}{2}\right)^2+k_1^2-\left(\frac{n_2^2-1}{2}\right)^2=0. \quad \text{(Mathematical Formula 8)}$$

17. A method of manufacturing an optical multilayer structure,
the optical multilayer structure including a first layer being light-absorptive, a gap portion with a size between an odd multiple of $\lambda/4$ ($\lambda$ is a wavelength of incident light) and an even multiple (including 0) of $\lambda/4$, the size being variable, and a second layer being transparent disposed in this order on a substrate, wherein a complex refractive index of the first layer is $N_1$ ($=n_1-ik_1$, $n_1$ is a refractive index, $k_1$ is an extinction coefficient, and i is an imaginary unit), a refractive index of the second layer is $n_2$, and a refractive index of an incident medium is 1.0, a relationship of Mathematical Formula 9 is satisfied,
the method comprising the step of:
forming a sacrificial layer on the first layer after forming the first layer on the substrate, and then forming the second layer on the sacrificial layer, and after that, selectively removing the sacrificial layer to form the gap portion:

$$(n_1-(n_2{}^2+1)/2)^2+k_1{}^2-((n_2{}^2-1)/2))^2=0. \quad \text{(Mathematical Formula 9)}$$

18. A method of manufacturing an optical multilayer structure, the optical multilayer structure including a gap portion with a size between an odd multiple of $\lambda/4$ ($\lambda$ is a wavelength of incident light) and an even multiple (including 0) of $\lambda/4$, the size being variable, and a transparent layer disposed in this order on a substrate being light-absorptive, wherein where a complex refractive index of the substrate is $N_1$ ($=n_1-i\cdot k_1$, $n_1$ is a refractive index, $k_1$ is an extinction coefficient, and i is an imaginary unit), a refractive index of the transparent layer is $n_2$, and a refractive index of an incident medium is 1.0, a relationship of Mathematical Formula 10 is satisfied,
the method comprising the step of:
forming a sacrificial layer on the substrate, and then forming the transparent layer on the sacrificial layer, and after that, selectively removing the sacrificial layer to form the gap portion.

$$\left(n_1 - \frac{n_2^2+1}{2}\right)^2 + k_1^2 - \left(\frac{n_2^2-1}{2}\right)^2 = 0. \quad \text{(Mathematical Formula 10)}$$

19. A method of manufacturing an optical multilayer structure according to claim 17 or claim 18, wherein
the sacrificial layer is selectively removed through etching with a dry gas.

20. A method of manufacturing an optical multilayer structure according to claim 17, wherein
the sacrificial layer is selectively removed through etching with a dry gas, and the first layer is formed of a material resistant to the dry gas.

21. A method of manufacturing an optical multilayer structure according to claim 18, wherein
the sacrificial layer is selectively removed through etching with a dry gas, and the substrate is formed of a material resistant to the dry gas.

22. A method of manufacturing an optical multilayer structure according to claim 20 or claim 21, wherein
the sacrificial layer is formed of silicon (Si), and xenon difluoride ($XeF_2$) is used as an etching gas.

23. An optical multilayer structure according to claim 2, further comprising:
a driving means for varying an optical size of the gap portion, wherein
the driving means varies the size of the gap portion so as to vary an amount of reflection, transmittance or absorption of incident light.

* * * * *

UNITED STATES PATENT AND TRADEMARK OFFICE
CERTIFICATE OF CORRECTION

PATENT NO.   : 6,850,365 B2
DATED        : February 1, 2005
INVENTOR(S)  : Hiroichi Ishikawa It is certified that error appears in the above-identified patent and that said Letters Patent is hereby corrected as shown below:

<u>Title page,</u>
Item [30], Foreign Application Priority Data, "Dec. 7, 2001" should be corrected to -- July 12, 2001 --

Signed and Sealed this

Nineteenth Day of July, 2005

JON W. DUDAS
*Director of the United States Patent and Trademark Office*